United States Patent
Lan et al.

(10) Patent No.: US 7,746,443 B2
(45) Date of Patent: Jun. 29, 2010

(54) METHOD OF UTILIZING DUAL-LAYER PHOTORESIST TO FORM BLACK MATRIXES AND SPACERS ON A CONTROL CIRCUIT SUBSTRATE

(75) Inventors: Chih-Chieh Lan, Taipei (TW); Hung-Yi Hung, Taipei (TW); Yu-Fang Wang, Taipei (TW)

(73) Assignee: HannStar Display Corporation, Taipei, Taiwan (CN)

( * ) Notice: Subject to any disclaimer, the term of this patent is extended or adjusted under 35 U.S.C. 154(b) by 732 days.

(21) Appl. No.: 11/257,240

(22) Filed: Oct. 24, 2005

(65) Prior Publication Data

US 2006/0033864 A1  Feb. 16, 2006

Related U.S. Application Data

(62) Division of application No. 10/457,966, filed on Jun. 10, 2003, now Pat. No. 6,958,792.

(30) Foreign Application Priority Data

Nov. 26, 2002 (TW) ............................. 91134380 A

(51) Int. Cl.
G02F 1/13 (2006.01)
G02F 1/136 (2006.01)
G02F 1/1335 (2006.01)
G02F 1/1339 (2006.01)

(52) U.S. Cl. .................. 349/187; 349/42; 349/106; 349/110; 349/155

(58) Field of Classification Search ................. 349/110, 349/155–156, 106–109, 42–43
See application file for complete search history.

(56) References Cited

U.S. PATENT DOCUMENTS

| 4,810,061 | A | 3/1989 | Nakanowatari et al. |
| 5,667,920 | A | 9/1997 | Chiulli et al. |
| 5,815,232 | A * | 9/1998 | Miyazaki et al. ............. 349/155 |
| 6,466,295 | B1 | 10/2002 | Hsieh |
| 6,897,927 | B2 * | 5/2005 | Tanaka et al. ................ 349/129 |
| 7,098,983 | B2 * | 8/2006 | Yee et al. ...................... 349/147 |

FOREIGN PATENT DOCUMENTS

JP 54-065053 5/1979

* cited by examiner

*Primary Examiner*—Dung T. Nguyen
(74) *Attorney, Agent, or Firm*—CKC & Partners Co., Ltd.

(57) ABSTRACT

A method of utilizing dual-layer photoresist to form black matrixes and spacers on a control circuit substrate is provided. The dual-layer photoresist includes a layer of black resin and a layer of transparent photoresist. The black resin, having an optical density greater than three, is mainly used to achieve the effect of black matrix. The transparent photoresist is mainly used to satisfy the needed cell gap between two transparent substrates.

12 Claims, 3 Drawing Sheets

METHOD OF UTILIZING DUAL-LAYER PHOTORESIST TO FORM BLACK MATRIXES AND SPACERS ON A CONTROL CIRCUIT SUBSTRATE

CROSS-REFERENCE TO RELATED APPLICATION

This application is a divisional of U.S. patent application Ser. No. 10/457,966, filed Jun. 10, 2003, entitled "Method Of Utilizing Dual-Layer Photoresist To Form Black Matrixes And Spacers On A Control Circuit Substrate", which is incorporated herein by reference.

BACKGROUND OF THE INVENTION

1. Field of Invention

The present invention relates to a structure of a color liquid crystal display (LCD) and a method of producing the same. More particularly, the present invention relates to a method of utilizing dual-layer photoresist to form black matrixes and spacers on a control circuit substrate and the LCD structure fabricated by the same method.

2. Description of Related Art

Liquid crystal is a material having properties between those of crystal and liquid. The alignment of the liquid crystal molecules varies with external stimulation such as an electrical field generated by an applied voltage. Hence, this feature of the liquid crystal molecules can be utilized to create a display unit.

Liquid crystal material was discovered in 1888, and applications thereof first appeared in 1963. However, the value of the commercial application was not proved until Sharp in Japan developed a liquid crystal display applied in a calculator. Japanese companies have continued to develop the technology and improve the product's function. Development and improvement have made the liquid crystal display widely applicable.

The thin-film-transistor (TFT) array substrate and the color filter substrate are fabricated separately and then are assembled in current technology for producing a color thin film transistor liquid crystal display (TFT-LCD). As a result of the limitations of assembling precision, the aperture ratio of the TFT-LCD cannot be effectively increased. Based on the limitations described above, the latest developments have led to a color filter layer being formed on a TFT array substrate by photolithography to form a color filter on array (COA) substrate. The subsequent process is only to assemble the COA substrate and a transparent indium tin oxide (ITO) substrate, with no precision limit on the assembling step. Therefore, the aperture ratio of the TFT-LCD can be greatly increased to decrease the power consumption. This is the application trend for future portable products.

The black matrixes and photoresist spacers have to be separately formed by two photolithography steps for a TFT-LCD made by the COA technique described above. If the black matrixes and the photoresist spacers are formed by only one photolithography step, only black resin of the negative photosensitive type can be used and the thickness of black resin needed is at least 5 μm. However, the light transmittance and the photosensitivity of the black resin are reduced and the required exposure dose is about 250 mj/cm$^2$. In comparison with black resin, the required exposure dose is only about 19 mj/cm$^2$ for a common transparent photoresist. Therefore, a very long exposure time is needed for patterning the black resin to form an ideal pattern, and the throughput of the stepper is seriously affected. Moreover, spacers are in charge of maintaining the distance between two transparent substrates; hence certain requirements exist on the shape and the height of the spacers. Consequently, the process margin for developing the black resin of the negative photosensitive type is very narrow.

SUMMARY OF THE INVENTION

It is therefore an objective of the present invention to pattern the black resin and the transparent photoresist by only one photo mask to form black matrixes and spacers simultaneously.

It is another objective of the present invention to provide a method of forming black matrixes and spacers on a control circuit substrate by double layers of photoresist to increase the throughput of products.

It is still another objective of the present invention to provide a method of forming black matrixes and spacers on a control circuit substrate by dual-layer photoresist to increase the process margin.

It is also another objective of the present invention to provide a color LCD made by the method mentioned above.

In accordance with the foregoing and other objectives of the present invention, a method of utilizing dual-layer photoresist to form black matrixes and spacers on a control circuit substrate is provided. A control circuit, made of control devices and a chessboard-like circuit having supporting areas, is located on a control circuit substrate. A passivation layer is located on the control circuit, and contact windows are formed therein to expose electrodes of the control devices, respectively. This method comprises the following steps. A color filter layer and pixel electrodes are sequentially formed on the control circuit substrate. The pixel electrodes electrically connect to the electrodes of the control devices through the contact windows, respectively. A first photoresist is formed on the control circuit substrate and then is soft-baked. The thickness of the first photoresist is large enough to make the optical density of the first photoresist be greater than 3. A second photoresist is formed on the first photoresist and then is soft-baked. Next, the second photoresist and the first photoresist are patterned to form spacers, respectively on the supporting areas, and black matrixeses, respectively on the control devices. The second photoresist and the first photoresist are hard-baked.

According to a preferred embodiment of the present invention, the first photoresist is black resin and the second photoresist is transparent photoresist. When the first photoresist is non-photosensitive black resin, the second photoresist is positive or negative photosensitive photoresist. The thickness of the non-photosensitive black resin is about 0.2-1.5 μm to. let the optical density of the black resin be greater than 3. The method of patterning the first and the second photoresist comprises the following steps. The second photoresist is exposed and then is developed by a developer solution. The developer solution is also used to remove the first photoresist uncovered by the second photoresist during developing the second photoresist.

According to another preferred embodiment of the present invention, the first photoresist is a black .resin and the second photoresist is a transparent photoresist. When the first photoresist is a negative photosensitive black resin, the second photoresist is negative photosensitive transparent photoresist. The thickness of the negative photosensitive black resin is about 1-2 μm to let the optical density of the black resin be greater than 3. The second and the first photoresist are patterned by photolithography.

In accordance with the foregoing and other objectives of the present invention, a method of utilizing dual-layer photoresist to form black matrixes and spacers on a control circuit substrate is provided. A control circuit, made of control devices and a chessboard-like circuit having supporting areas, is located on a control circuit substrate. A passivation layer is located on the control circuit, and contact windows are formed therein to expose electrodes of the control devices, respectively. This method comprises the following steps. A color filter layer and pixel electrodes are sequentially formed on the control circuit substrate. The pixel electrodes electrically connect to the electrodes of the control devices through the contact windows, respectively. A first photoresist is formed on the control circuit substrate and then is soft-baked. A second photoresist is formed on the first photoresist and then is soft-baked. The thickness of the second photoresist is large enough to make the optical density of the second photoresist be greater than 3. Next, the second photoresist and the first photoresist are patterned to form spacers, respectively on the supporting areas, and black matrixeses, respectively on the control devices, by photolithography. The second photoresist and the first photoresist are hard-baked.

According to another preferred embodiment of the present invention, the first photoresist is transparent photoresist and the second photoresist is black resin. When the second photoresist is a negative photosensitive black resin, the first photoresist is negative photosensitive transparent photoresist. The thickness of the negative photosensitive black resin is about 1-2 μm to let the optical density of the black resin be greater than 3.

In accordance with the foregoing and other objectives of the present invention, a color liquid crystal display is provided. The color liquid crystal display comprises a first transparent substrate, a control circuit, a passivation layer, a color filter layer, pixel electrodes, first photoresist layers, second photoresist layers, a second transparent substrate, a common electrode, and a liquid crystal layer. The control circuit, made of control devices and a chessboard-like circuit having supporting areas, is located on the first transparent substrate. A passivation layer is located on the control circuit, and contact windows are located therein to expose electrodes of the control devices, respectively. A color filter layer and pixel electrodes are sequentially located on the control circuit substrate. The pixel electrodes electrically connect to the electrodes of the control devices through the contact windows, respectively. The first photoresist layers are respectively located on the supporting areas and the control devices. The second photoresist layers are respectively located on the first photoresist layers. The common electrode is on a surface, which faces the first transparent substrate, of the second transparent substrate. The liquid crystal layer is located between the first and the second transparent substrates.

According to a preferred embodiment of the present invention, the first photoresist is black resin and the second photoresist is transparent photoresist. When the first photoresist is non-photosensitive black resin, the second photoresist is positive or negative photosensitive photoresist. The thickness of the non-photosensitive black resin is about 0.2-1.5 μm to let the optical density of the black resin be greater than 3. The method of patterning the first and the second photoresist comprises the following steps. The second photoresist is exposed and then is developed by a developer solution. The developer solution is also used to remove the first photoresist uncovered by the second photoresist during developing the second photoresist.

According to another preferred embodiment of the present invention, the first photoresist is a black resin and the second photoresist is a transparent photoresist. When the first photoresist is a negative photosensitive black resin, the second photoresist is negative photosensitive transparent photoresist. The thickness of the negative photosensitive black resin is about 1-2 μm to let the optical density of the black resin be greater than 3. The second and the first photoresist are patterned by photolithography.

According to this preferred embodiment of the present invention, the first photoresist is transparent photoresist and the second photoresist is black resin. When the second photoresist is a negative photosensitive black resin, the first photoresist is negative photosensitive transparent photoresist. The thickness of the negative photosensitive black resin is about 1-2 μm to let the optical density of the black resin be greater than 3.

In the foregoing, the invention utilizes the much-improved light transmittance and photosensitivity properties of the transparent photoresist rather than those of the black resin to decrease the thickness needed by black resin used in the prior arts. Hence, the exposure time needed for the black resin used in the prior arts can be greatly reduced to increase greatly the product throughput.

It is to be understood that both the foregoing general description and the following detailed description are examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIGS. 2 and 4 are cross-sectional diagrams of utilizing dual-layer photoresist to form black matrixes and spacers on a control circuit substrate in FIG. 1 according to another preferred embodiment of this invention.

DESCRIPTION OF THE PREFERRED EMBODIMENTS

Figure 1:
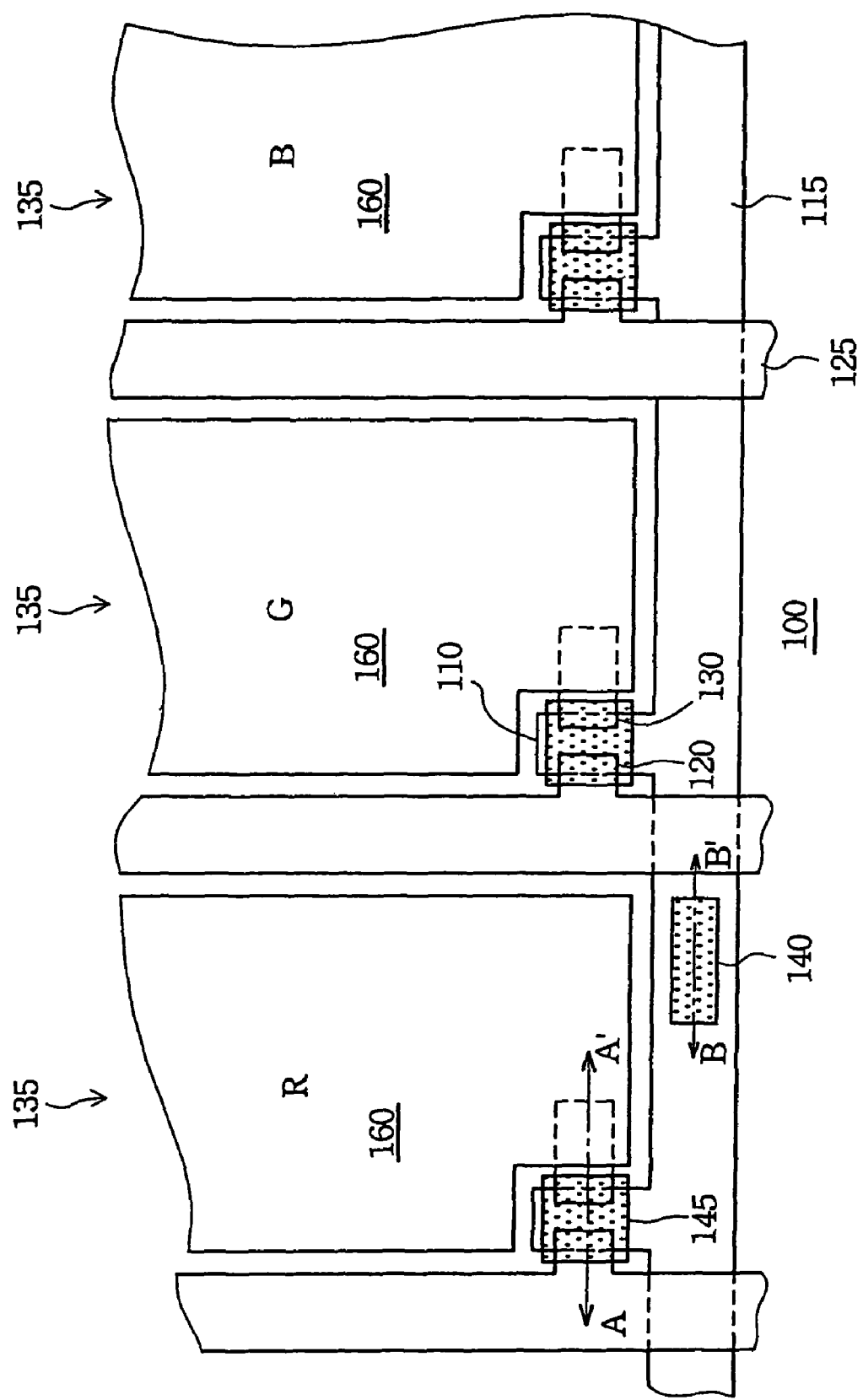
FIG. 1 is a vertical view of a control circuit substrate according to one preferred embodiment of this invention.

Reference will now be made in detail to the present preferred embodiments of the invention, examples of which are illustrated in the accompanying drawings. Wherever possible, the same reference numbers are used in the drawings and the description to refer to the same or like parts.

As stated above, this invention provides a method of utilizing dual-layer photoresist to form black matrixes and spacers on a control circuit substrate and the LCD structure fabricated by the same method to increase greatly the product throughput.

FIG. 1 is a vertical view of a control circuit substrate according to one preferred embodiment of this invention. In FIG. 1, a control circuit, such as a thin film transistor (TFT) array, is formed on a transparent substrate 100. Each TFT in the TFT array comprises gate 110, source 120 and drain 130. Each gate 110 electrically connects to a gate line 115 made by a first metal layer. Each source 120 electrically connects to a data line 125 made by a second metal layer. The data lines 125 cross over the gate lines 115 to define pixels 135. Red (R), green (G) and blue (B) color filters are respectively formed on each pixel 135 later, and each TFT is respectively formed in a corner of each pixel 135. Hence, a control circuit substrate is formed.

The black matrixes are formed on the areas 145 above the TFTs to prevent photocurrent occurring during the "off" state of the TFTs. The spacers are formed on opaque areas such as supporting areas 140 on the gate lines 115. The material of the gate lines 115 and the data lines 125 is metal, which is an opaque material. Therefore, black matrixes need not be formed on the gate lines 115 and the data lines 125 to compartment adjacent pixels 135. In FIG. 1, the relative positions of the pixel electrodes 190 formed later and the TFT are also displayed. The subsequent processes are described in the following embodiments 1-2.

Embodiment 1

Figure 2:
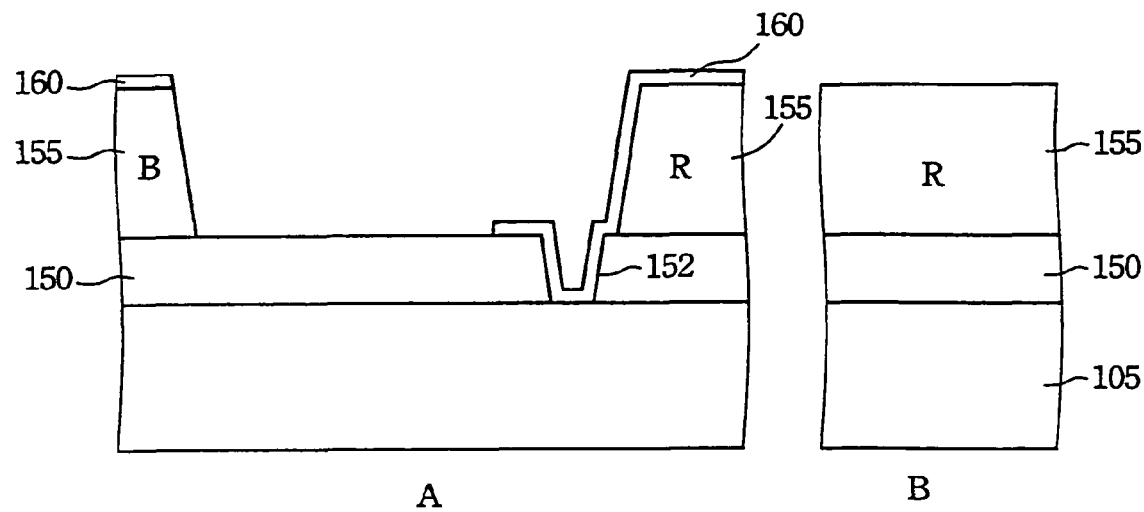
FIGS. 2 and 3 are cross-sectional diagrams of utilizing dual-layer photoresist to form black matrixes and spacers on a control circuit substrate in FIG. 1 according to a preferred embodiment of this invention.
Figure 3:
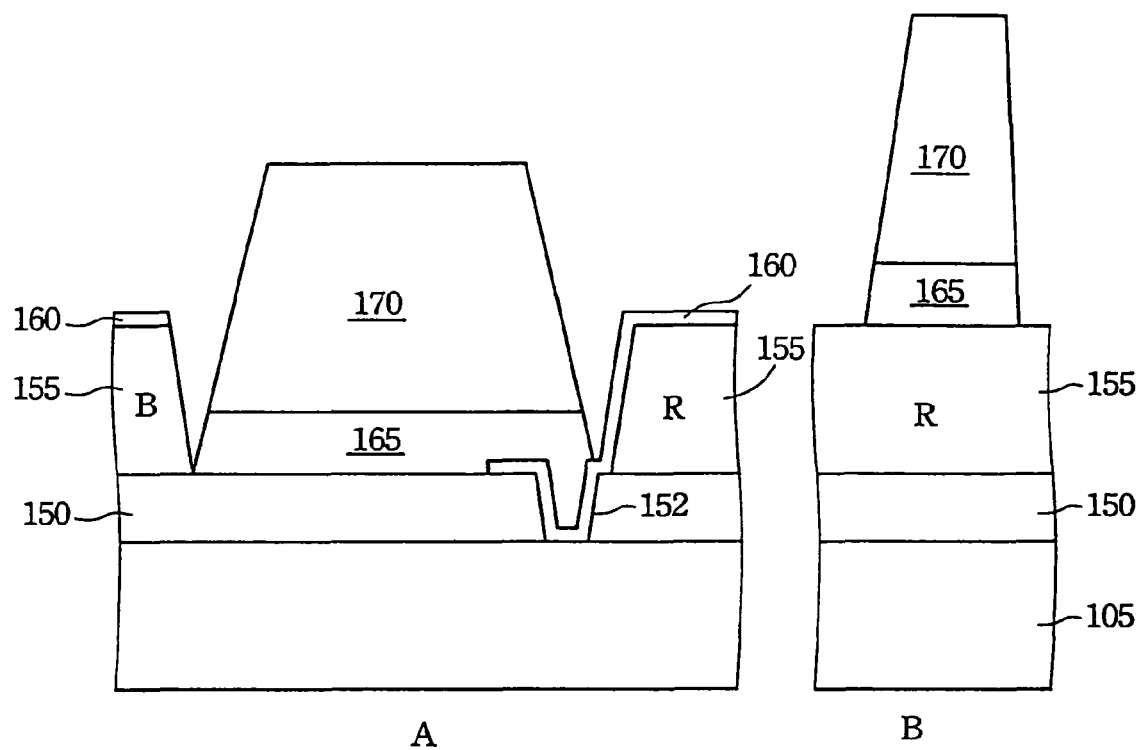

FIGS. 2 and 3 are cross-sectional diagrams of utilizing dual-layer photoresist to form black matrixes and spacers on a control circuit substrate in FIG. 1 according to a preferred embodiment of this invention. The labels A and B in FIGS. 2 and 3 indicate the cross-sectional views of the cross-sectional lines AA' and BB', respectively. The TFT structures are not drawn in the Parts A in FIGS. 2 and 3 to simplify the pictures.

In FIG. 2, a passivation layer 150 such as a silicon nitride layer is formed by, for example, chemical vapor deposition (CVD) on the control circuit substrate 105 (i.e. the transparent substrate 100 having the control circuit thereon as shown in FIG. 1). The control circuit substrate 105 comprises, for example, a TFT array substrate. Next, the passivation layer 180 is patterned by, for example, photolithography and etching to form contact windows 152 therein to expose drains 130 (not shown in FIG. 2) of the TFT, respectively.

A color filter layer 155 is formed on the control circuit substrate 105. The color filter is made of red, green and blue colors color filters respectively on pixels 135 (as shown in FIG. 1). In general, the red, green and blue photoresist are respectively patterned by three photolithography steps to form the red, green and blue colors color filters and thus the color filter layer 155.

A transparent conductive layer is formed and then is patterned to form pixel electrodes 160 by, for example, photolithography and etching. The pixel electrodes 160 electrically connect to the drains 130 (not shown in FIG. 2) of the control devices through the contact windows 152, respectively. A material of the pixel electrodes 160 includes indium tin oxide or indium zinc oxide.

In FIG. 3, a black resin is formed on the control circuit 105 having the color filter layer 155 and the pixel electrodes 160 located thereon. Then, the black resin is soft-baked. A transparent photoresist is formed on the black resin and then is soft-baked. Next, the transparent photoresist and the black resin are patterned and hard-baked to form black resin layers 165 and transparent photoresist layers 170. Consequently, black matrixes is formed by stacking the black resin layers 165 and the transparent photoresist layers 170 on Part A, and spacers are formed by stacking the black resin layers 165 and the transparent photoresist layers 170 on Part B.

According to a preferred embodiment of this invention, when a material of the black resin layers 165 is non-photosensitive black resin, the material of the transparent photoresist layers 170 is positive or negative photosensitive transparent photoresist. The thickness of the non-photosensitive black resin is about 0.2-1.5 μm so that the optical density of the black resin is greater than 3 to shield the control devices from external light. Moreover, the total thickness of the black resin layers 165 and the transparent photoresist layers 170 is equal to the required spacing between the two transparent substrates of a liquid crystal display.

The method of patterning the black resin and the transparent photoresist comprises the following steps. The transparent photoresist is exposed and then is developed by a developer solution. The developer solution is also used to remove the black resin uncovered by the transparent photoresist during developing the transparent photoresist. Since the needed exposure dose for exposing the transparent photoresist is less than that for exposing the black resin, the exposure dose required for the transparent photoresist is much less than that for the black resin alone in the exposure step. In the subsequent developing step, the insoluble transparent photoresist 170 can protect the black resin 165 lying below by being insoluble in the developer solution. Therefore, only one photo mask, i.e. one photolithography process, is needed to form the black matrixes and the spacers simultaneously.

According to another preferred embodiment, when a material of the black resin layers 165 is a negative photosensitive black resin, the material of the transparent photoresist layers 170 is also a negative photosensitive transparent photoresist. Therefore, the black resin and the transparent photoresist can be simultaneously patterned by conventional photolithography.

The thickness of the non-photosensitive black resin is about 1-2 μm so that the optical density of the black resin is greater than 3 to shield the control devices from external light. Moreover, the total thickness of the black resin layers 165 and the transparent photoresist layers 170 is equal to the required spacing between the two transparent substrates of a liquid crystal display. Similarly, since the exposure dose required for exposing the transparent photoresist is less than that for the black resin, the exposure dose required for the transparent photoresist and the black resin is much less than that for the black resin alone in the exposure step. In the subsequent developing step, the unexposed black resin and the transparent photoresist can be simultaneously dissolved in the developer solution. Therefore, only one photo mask, i.e. one photolithography process, is needed to form the black matrixes and the spacers simultaneously.

The subsequent fabrication processes are well known by persons skilled in the art. Hence, the cross-sectional diagrams of the fabrication processes are omitted here, and subsequent fabrication processes are described verbally, only.

Next, another transparent conductive layer is formed on another transparent substrate as a common electrode. These two transparent substrates are parallel assembled, and the pixel electrodes 160 and the common electrode face each other. The periphery of the two transparent substrates is sealed, and only one opening is left for pouring liquid crystal into the space between the two transparent substrates. After pouring in the liquid crystal to fill the space between the two transparent substrates, the opening is sealed to accomplish the fabrication process of a TFT LCD.

Embodiment 2

Figure 4:
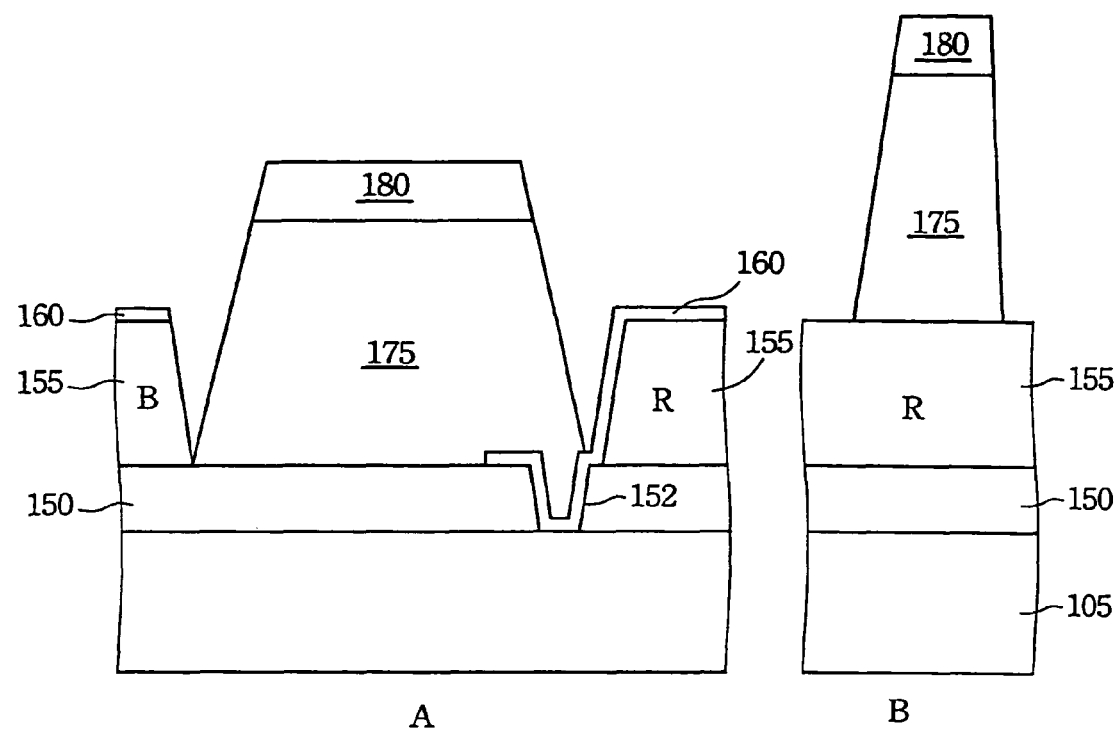

FIGS. 2 and 4 are cross-sectional diagrams of utilizing dual-layer photoresist to form black matrixes and spacers on a control circuit substrate in FIG. 1 according to another preferred embodiment of this invention. The labels A and B in FIGS. 2 and 4 indicate the cross-sectional views of the cross-sectional lines AA' and BB', respectively. The TFT structures are not drawn on the Parts A in FIGS. 2 and 4 to simplify the pictures. Besides, a detailed description of FIG. 2 has been given above, and hence is omitted here.

In FIG. 4, a transparent photoresist is formed on the control circuit 105 having the color filter layer 155 and the pixel electrodes 160 located thereon. Then, the transparent photoresist is soft-baked. A black resin is formed on the black resin and then is soft-baked. Next, the black resin and the transparent photoresist are patterned and hard-baked to form transparent photoresist layers 175 and black resin layers 180. Consequently, black matrixes is formed by stacking the transparent photoresist layers 175 and the black resin layers 180 on Part A, and spacers are formed by stacking the transparent photoresist layers 175 and the black resin layers 180 on Part B.

According to another preferred embodiment, when a material of the black resin layers 180 is a negative photosensitive black resin, the material of the transparent photoresist layers 175 is also a negative photosensitive transparent photoresist. Therefore, the black resin and the transparent photoresist can be pattered by conventional photolithography simultaneously.

The thickness of the non-photosensitive black resin is about 1-2 μm so that the optical density of the black resin is greater than 3 to shield the control devices from external light. Moreover, the total thickness of the black resin layers 165 and the transparent photoresist layers 170 is equal to the required spacing between the two transparent substrates of a liquid crystal display. Similarly, since the exposure dose required for the transparent photoresist is less than that for the black resin, the exposure dose required for the transparent photoresist and the black resin is much less than that for the black resin alone in the exposure step. In the subsequent developing step, the unexposed black resin and the transparent photoresist can be simultaneously dissolved in the developer solution. Therefore, only one photo mask, i.e. one photolithography process, is needed to form the black matrixes and the spacers simultaneously.

The subsequent fabrication processes are well known by persons skilled in the art. Hence, the cross-sectional diagrams of the fabrication processes are omitted here, and subsequent fabrication processes are described verbally, only.

Next, another transparent conductive layer is formed on another transparent substrate as a common electrode. These two transparent substrates are parallel assembled, and the pixel electrodes 160 and the common electrode face each other. The periphery of the two transparent substrates is sealed, and only one opening is left for pouring liquid crystal into the space between the two transparent substrates. After pouring in the liquid crystal to fill the space between the two transparent substrates, the opening is sealed to accomplish the fabrication process of a TFT LCD.

In light of foregoing, the function of the black matrixes is achieved by black resin having a thickness that makes the optical density of the black resin greater than 3. The function of the spacers is achieved by the transparent photoresist to maintain the required spacing between the two transparent substrates of a LCD. Therefore, the transparent photoresist having much improved properties of light transmittance and photosensitivity can be used to replace most of the black resin to greatly reduce the required thickness of a single black resin layer. Therefore, utilizing this invention can not only decrease the required exposure time but also increase the process margin, and thus the product throughput is greatly increased.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

The invention claimed is:

1. A method of utilizing dual-layer photoresist to form black matrixes and spacers on a control circuit substrate, the control circuit substrate having a control circuit made of control devices having a passivation layer formed thereon, and the passivation layer having contact windows to expose electrodes of the control devices respectively, comprising:
    forming a color filter layer on the control circuit substrate;
    forming pixel electrodes on the color filter layer, each pixel electrode electrically connecting to the electrode of each of the control devices through each of the contact windows;
    forming a black resin on the control circuit substrate to overlap the contact windows in the passivation layer;
    performing a first soft baking step to soft-bake the black resin;
    forming a transparent photoresist on the black resin, wherein an exposure dose of the transparent photoresist is about 19 mj/cm$^2$;
    performing a second soft baking step to soft-bake the transparent photoresist;
    patterning the transparent photoresist and the black resin to form spacers respectively on opaque areas of the control circuit by only one photomask; and
    hard baking the transparent photoresist and the black resin.

2. The method of claim 1, wherein an optical density of the black resin is greater than 3.

3. The method of claim 1, wherein the black resin is non-photosensitive.

4. The method of claim 3, wherein a thickness of the black resin is about 0.2-1.5 μm.

5. The method of claim 3, wherein the step of patterning the transparent photoresist and the black resin further comprises:
    exposing the transparent photoresist; and
    developing the transparent photoresist to pattern the transparent photoresist by using a developer solution, the developer solution being used to remove the black resin uncovered by the transparent photoresist.

6. The method of claim 3, wherein the transparent photoresist is positive photosensitive in type.

7. The method of claim 3, wherein the transparent photoresist is negative photosensitive in type.

8. The method of claim 1, wherein the transparent photoresist is negative photosensitive in type while the black resin is negative photoresist in type.

9. The method of claim 8, wherein a thickness of the black resin is about 1-2 μm.

10. The method of claim 8, wherein the step of patterning the transparent photoresist and the black resin further comprises:
    exposing the transparent photoresist and the black resin; and
    developing the transparent photoresist and the black resin.

11. The method of claim 1, further comprising:
    forming a transparent conductive layer to form a common electrode on a transparent substrate;
    parallel assembling the control circuit substrate and the transparent substrate, the pixel electrode and the common electrode being located inside;
    sealing a periphery of the control circuit substrate and the transparent substrate and leaving one opening only;
    pouring liquid crystal into the opening to fill a space between the control circuit substrate and the transparent substrate; and
    sealing the opening.

12. The method of clam 1, wherein the control circuit comprises a thin-film-transistor array substrate.

* * * * *